United States Patent [19]

Smart et al.

[11] Patent Number: 4,987,157

[45] Date of Patent: Jan. 22, 1991

[54] RESINS WITH HIGH SURFACE AREAS AND POROSITIES

[75] Inventors: Bruce E. Smart; Owen W. Webster, both of Wilmington, Del.

[73] Assignee: E. I. DuPont de Nemours and Company, Wilmington, Del.

[21] Appl. No.: 472,997

[22] Filed: Jan. 31, 1990

[51] Int. Cl.$^5$ .............................................. C08J 9/00
[52] U.S. Cl. ...................................... 521/50; 521/64; 521/114; 521/150; 521/154; 521/182; 528/271; 528/370
[58] Field of Search ................ 528/271, 370; 521/50, 521/154, 182, 114, 64, 150

[56] References Cited

U.S. PATENT DOCUMENTS

| | | | |
|---|---|---|---|
| 3,322,695 | 5/1967 | Alfrey, Jr. et al. | 260/2.5 |
| 3,663,467 | 5/1972 | Albright | 260/2.5 |
| 3,767,600 | 10/1973 | Albright | 260/2.2 |
| 3,969,325 | 7/1976 | Conciatori et al. | 260/78.41 |
| 4,221,871 | 9/1980 | Meitzner et al. | 521/29 |
| 4,224,415 | 9/1980 | Meitzner et al. | 521/38 |
| 4,382,124 | 5/1983 | Meitzner et al. | 521/38 |
| 4,857,630 | 8/1989 | Kim | 528/397 |

OTHER PUBLICATIONS

R. Kunin, et al., J. Am. Chem. Soc., vol. 84, pp. 305–306(1962).

K. A. Kun and R. Kunin in Polym. Lett., vol. 2, pp. 587'4 591 (1964).

R. L. Gustafson, et al., Ind. Eng. Chem., Prod. Res. and Deu., vol. 7, pp. 107–115 (1968).

J. Paleos, J. Colloid Interface Sci., vol. 31, pp. 7–18 (1969).

W. G. Rixey and C. J. King, J. Colloid Interface Sci., vol. 131, pp. 320–332 (1989).

O. Ermer, J. Am. Chem. Soc., vol. 110, pp. 3747–3754 (1988).

B. F. Hoskins and R. Robson, J. Am. Chem. Soc., vol. iii, pp. 5962–5964 (1989).

S. M. Aharoni and S. F. Edwards, Macromol., vol. 22, pp. 3361–3374 (1989).

I. Johannsen, et al., Macromol., vol. 22, pp. 566–570 (1989).

P. A. Agaskar, J. Am. Chem. Soc., vol. 111, pp. 6858–6859 (1989).

Primary Examiner—Morton Foelak

[57] ABSTRACT

Organic resins with high surface areas and porosities, which are insoluble in organic solvents and contain few or no flexible groups in the resin structure, are disclosed. Also disclosed is a process for making such resins from polyfunctional aryl alkali metal compounds and a second polyfunctional monomer. Such resins are useful as absorbants.

52 Claims, No Drawings

RESINS WITH HIGH SURFACE AREAS AND POROSITIES

FIELD OF THE INVENTION

This invention provides high surface area and porosity resins, which are highly crosslinked, insoluble organic compositions and useful as absorbants.

BACKGROUND OF THE INVENTION

It has been known in the art for many years that certain highly crosslinked addition polymers such as those derived from styrene and divinylbenzene, and from (meth)acrylates and polyfunctional (meth)acrylates, when made under certain conditions, have very high surface areas and porosities. These polymers, sometimes called macroreticular polymers, are articles of commerce, for example those being sold by the Rohm and Haas Company under the tradename Amberlite, and in particular the Amberlite XAD series. Described in the next 7 paragraphs is some of the information published about macroreticular resins. More information may be found in the references cited.

An early report on macroreticular resins is that of R. Kunin, et. al., J. Am. Chem. Soc., vol. 84, pp. 305-306 (1962), in which it is reported that copolymers of styrene and divinylbenzene give polymers with high surface areas, mostly reported to be under 100 $m^2/g$. The apparent key to getting high surface areas is performing the polymerization in a good solvent for the monomers but a poor solvent for polymers.

K. A. Kun and R. Kunin in Polym. Lett., vol. 2, pp. 587-591 (1964), describe the structure of such macroreticular polymers as "... agglomerates of randomly packed microspheres with a continuous nongel pore structure similar to that found in bone char or alumina."

R. L. Gustafson, et al., Ind. Eng. Chem., Prod. Res. and Dev., vol. 7, pp. 107-115 (1968) further describe the adsorption properties of these styrenedivinylbenzene polymers, but in this paper several of the polymers have surface areas much greater than 100 $m^2/g$ and porosities of 25% or more.

J. Paleos, J. Colloid Interface Sci., vol. 31, pp. 7-18 (1969) further describes adsorption by styrene divinylbenzene polymers, and also describes macroreticular polymers derived from acrylic monomers.

W. G. Rixey and C. J. King, J. Colloid Interface Sci., vol. 131, pp. 320-332 (1989) describe some surface area and porosity properties of the Amberlite resins.

A booklet published in 1985 by Rohm and Haas Co., Philadelphia, PA, entitled "Catalysis by functionalized Porous Organic Polymers" has a useful review of macroreticular resins, both of their properties and historically.

U.S. Pat. No. 4,224,415 describes the preparation of macroreticular resins from acrylic and styrenic monomers, among others, in particular types of solvent systems. The solvent systems were necessary to produce the macroreticular resins. Other U.S. Patents illustrating the synthesis of macroreticular resins, and the compositional range of monomers useful, include U.S. Pat. Nos. 4,221,871, 4,382,124, 3,663,467, 3,767,600 and 3,322,695. Most of these use basically the same type of technology described in 4,224,415.

In all of the above references cited, all of the polymers have flexiblizing groups (infra) resulting from the fact that they are formed by polymerization of vinyl monomers (polymerization of any vinyl monomer results in polymers with flexiblizing groups).

O. Ermer, in J. Am. Chem. Soc., vol. 110, pp. 3747-3754 (1988), describes the theoretical possibility of making polymers containing adamantane groups that would have interstities of fixed size, much like a zeolite. However, the discussion is purely theoretical, and no polymers are actually made. The compound used experimentally is a monomer that is held together by hydrogen bonding, not a polymer or resin.

B. F. Hoskins and R. Robson, J. Am. Chem. Soc., vol. 111, pp. 5962-5964 (1989), describe the preparation of a copper complex that is crystalline but has large adamantane-like cavities. It was speculated in a report on this paper in Chem. Eng. News, July 31, 1989, p. 32 that such a structure may provide molecular sieve and ion-exchange properties. No mention is made of making similar organic polymers or resins.

S. M. Aharoni and S. F. Edwards in Macromol., vol. 22, pp. 3361-3374 (1989) describe gels made from rigid polyamide networks. Virtually all of the work described in this paper is done when the polymer is swollen with a solvent to form a gel. Dried gel particles were described as "highly ramified" but no mention is made of surface area or porosity.

I. Johannsen, et. al., Macromol., vol. 22, pp. 566-670 (1989) describe the polymerization of 1,3,5-triaminobenzene to give an air unstable highly crosslinked polymer. When polymerized over about 24 hr. the polymer is described as consisting of spheres 1-10 micrometers in diameter. No mention is made of high porosity or surface area.

P. A. Agaskar in J. Am. Chem. Soc., vol. 111, pp. 6858-6859 (1989) describes some macromolecules made from "vinyl functionalized spherosilicates." Although the material is described as being potentially microporous, after removal of solvent no microporosity was found experimentally.

U.S. Pat. No. 4,857,630 describes the preparation of highly branched, functionalized, wholly aromatic poly(arylenes). No mention is made of the surface area or porosity of these materials, and they are soluble in organic solvents.

U.S. Pat. No. 3,969,325 describes a process for the formation of a so-called "BBB" polymer with a high surface area, 100 to 500 $m^2/g$ or more. No porosity of this polymer is reported in this patent. Although this polymer has no flexiblizing groups, it is reported elsewhere to be soluble in methanesulfonic acid.

It is the object of this invention to provide insoluble, high surface area and high porosity resins that contain little or no flexiblizing groups, for use as absorbants as for oil spills. A further object of this invention is to provide a method for the synthesis of such resins.

SUMMARY OF THE INVENTION

This invention provides insoluble resins that have a surface area of at least 100 $m^2/g$ and a porosity of at least 20%, and wherein the resin contains less than 10 mole percent of flexiblizing groups. This invention also provides a process for making the above resins by reacting a polyfunctional aryl alkali metal compound with another polyfunctional monomer to form the resin.

DETAILS OF THE INVENTION

This invention concerns a composition, comprising, an insoluble resin with a surface area of at least 100 $m^2/g$ and a porosity of at least 20%, and wherein said resin contains less than 10 mole percent, based on the total amount of monomer, of flexiblizing groups.

By insoluble is meant a composition that does not dissolve in common organic solvents or a combination of common organic solvents, to form a solution (as opposed to a suspension or dispersion). By common organic solvents are meant compounds that are commonly available to chemical research workers, such as aliphatic and aromatic hydrocarbons, halocarbons, alcohols, ketones, aldehydes, fluorocarbons, ethers, amides, sulfoxides, sulfonic acids, amines and others. A few typical solvents are hexane, toluene, ethanol, acetone, benzaldehyde, methylene chloride, N,N-dimethylformamide, N,N-dimethyacetamide, tetrahydrofuran, dimethylsulfoxide, methanesulfonic acid, triethylamine and so on. In order to be soluble in a solvent, the resin must be recoverable substantially unchanged from a solution in that solvent (in the case of organic solvents that are acidic or basic, it may be necessary, and is permissible, to neutralize any salt that is formed between the solvent and the polymer, in order to recover the original polymer). Polymers that cannot be recovered substantially unchanged from solution in a solvent, are considered insoluble. The insolubility is believed due to the highly crosslinked nature of the resin (infra).

By surface area is meant the surface area as measured by the BET technique. This technique is well known to those skilled in the art. Further information on this method may be found in S. J. Gregg and K. S. W. Sing, Adsorption, Surface Are and Porosity, Academic Press, New York, 1967, especially Chapter 2, which is hereby included by reference. The equation used to calculate surface area is equation 2.37 given on pg. 49 of the above book. Specific details may be found in the description of the techniques used in the Examples. The resins have a minimum surface area of 100 m$^2$/g, preferably more than about 200 m$^2$/g, and most preferably more than about 400 m$^2$/g.

By porosity is meant the porosity as measured by the BET technique. Further information on this method may be found in S. J. Gregg and K. S. W. Sing, Adsorption, Surface Are and Porosity, Academic Press, New York, 1967, especially Chapter 3, which is hereby included by reference. The method used to calculate porosity is described on pp. 160–167 of the Gregg & Sing (supra). Specific details may be found in the description of techniques used in the Examples. Porosity is often expressed in the units mL/g. This is converted herein by the formula: mL/g × 100 = percent porosity. The resins have a minimum porosity of 20%, preferably about 25% or more, most preferably about 35% or more.

By the term "flexiblizing group" is meant a group in a chain in the resin network that consists of more than 2 "flexiblizing atoms". By "in a chain in the resin network" is meant that the flexiblizing group is not in a side group, but is part of the polymer chains (see illustrations of various groups infra). Since in these resins it is impossible to characterize a particular part of the polymer as a "main" chain or a "crosslink" because of the short distances between branch or crosslink points, all parts of the resin network are included in "a chain in the resin network."

By "flexiblizing atoms" are meant aliphatic and cycloaliphatic carbon atoms, and all heteroatoms that are part of the network (not including a side group). Carbon atoms that are part of carbon-carbon double or triple bonds or part of aromatic rings are not flexiblizing atoms. Heteroatoms are any atoms besides carbon, hydrogen and halogens that are normally found in organic compounds. Heteroatoms include, but are not limited to, oxygen, nitrogen, phosphorous, silicon, germanium, tin, boron and sulfur.

It is believed that resins with improved properties are obtained if the amount of flexiblizing groups is kept to a minimum, less than 10 mole percent, preferably less than 5 mole percent, and most preferably, none. The flexiblizing groups may already be present in a particular monomer, and be incorporated into the resin with that monomer. In that case less than 10% of that monomer, as a percentage of the total number of moles of monomer used, should be used. Alternatively, a flexiblizing group may be formed during the polymerization. In that case the calculated total number of moles of the flexiblizing group formed should be less than 10% of the total number of moles of monomer used.

In order to more clearly define what is and is not a flexiblizing group, the following illustrative examples are offered. In these examples, unfilled covalent bonds that are written horizontally indicate that bond is to a non-flexiblizing atom. Unfilled bonds written vertically are to side groups. Thus ester,

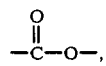

and amide groups,

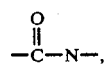

are not flexiblizing groups since they have only two flexiblizing groups in the chain, the carbonyl carbon and the ether oxygen or nitrogen. The oxo oxygen atom of the carbonyl group is considered a "side group."

The groupings —CH$_2$—CH$_2$—CH$_2$—, —CH$_2$—O—CH$_2$— and —CH$_2$—NH—CH$_2$— are flexiblizing groups since they contain more than 2 flexiblizing atoms in the resin chain, but

is not a flexiblizing group since both methyl groups are side groups. Similarly,

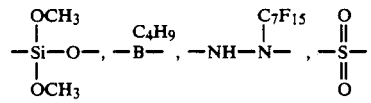

and alkyl groups on aromatic rings are not flexiblizing groups. However,

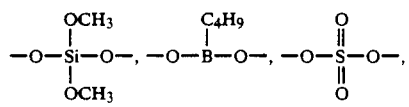

1,4-cyclohexylene and 1,3-cyclohexylene are flexiblizing groups since they contain more than 2 flexiblizing atoms in the resin chain. In the case of 1,2-cyclohexylene, it is more complex, since one could count 2 or 4 cycloaliphatic carbon atoms in the resin chain. In cases such as this, the lower number prevails, and 1,2-cyclohexylene is not a flexiblizing group.

As stated above, it is preferred to have groups in the polymer which are not flexible. Thus preferred relatively rigid groups that are part of the resin structure include, but are not limited to, 1,4-phenylene, 4,4'-biphenylene, 4",4-p-terphenylene, 9,10-anthracenylene, 2,6-anthracenylene, 1,4-naphthalenylene, 2,6-naphthalenylene, 3,3'-biphenylene, bis(4-phenylene)ether, tris(4-phenylene)amine, tetrakis(4-phenylene)methane, bis(4-phenylene)sulfide, 2,2-bis(4-phenylene)propane, tetrakis(4-phenylene)silane and bis(4-phenylene)dimethylsilane. In many of the above mentioned rigid groups the bonds linking the groups to the resin are either linear or colinear with respect to one another; such configurations of these bonds are preferred. Especially preferred relatively rigid groups are 1,4-phenylene, 4,4'-biphenylene and 4",4-p-terphenylene. The most preferred rigid group is 4,4'-biphenylene.

These resins with high surface area and high porosity are useful as absorbants (as for cleaning up chemical and petroleum spills) (see Example 2).

This invention also concerns a process for the production of resin, comprising, reacting at least one polyfunctional aryl alkali metal compound with at least one second polyfunctional monomer, and isolating a resin with a surface area of at least 100 m$^2$/g and a porosity of at least 20%, and wherein said resin contains less than 10 mole percent, based on the total amount of monomer, of flexiblizing groups, provided that at least 10 mole percent of the total moles of said polyfunctional aryl alkyl metal compound and said second polyfunctional monomer has a functionality of 3 or more.

The definitions and preferred levels of surface area, porosity and flexiblizing groups in this process are the same as recited above.

By the term "polyfunctional aryl alkali metal compound" is meant a compound that contains two or more alkali metal atoms bound to carbon atoms of aromatic rings in the molecule. It obvious to those skilled in the art that only one alkali metal atom may be bound to an aromatic carbon atom. The functionality of the compound is determined by how many alkali metal atoms are bound to each molecule of the polyfunctional aryl alkali metal compound. If more than one aromatic ring is present in the polyfunctional aryl alkali metal compound, the alkali metal atoms present may be bound to carbon atoms in the same or different rings. A preferred alkali metal is lithium.

Polyfunctional aryl alkali metal compounds can be made by a variety of methods known to those skilled in the art. For instance, see B. S. Wakefield, Organolithium Methods, Academic Press, London, 1988 (especially pg. 24 et. seq.), which is hereby included by reference, and the specific procedures given in the Examples.

It is understood by those skilled in the art that any particular polyfunctional aryl alkali metal compounds often may be made by more than one method or from different starting compounds. Thus these polyfunctional aryl alkali metal compounds are most easily specified by the carbon skeleton they contain and the positions of the metal atoms. Thus, preferred carbon skeletons (open bonds are to alkali metal atoms) are 1,4-phenylene, 4,4'-biphenylene, 4",4-p-terphenylene, 9,10-anthracenylene, 2,6-anthracenylene, 1,4-naphthalenylene, 2,6-naphthalenylene, 3,3'-biphenylene, bis(4-phenylene)ether, tris(4-phenylene)amine, tetrakis(4-phenylene)methane, bis(4-phenylene)sulfide, 2,2-bis(4-phenylene)propane, tetrakis(4-phenylene)silane and bis(4-phenylene)dimethylsilane. In many of the above mentioned polyfunctional aryl alkali metal compounds skeletons, the carbon-alkali metal bonds are either linear or colinear with respect to one another; such configurations of the carbon-alkali metal bonds are preferred. Especially preferred carbon skeletons are 1,4-phenylene, 4,4'-biphenylene and 4",4-p-terphenylene. The most preferred carbon skeleton is 4,4'-biphenylene.

The polyfunctional aryl alkali metal compound, in combination with the second polyfunctional monomer, must meet the limitation on flexiblizing groups in the composition of the resin that is produced. Otherwise, any substituents that do not interfere with the production of the polyfunctional aryl alkali metal compound or its subsequent reaction with the second polyfunctional monomer may be present in the polyfunctional aryl alkali metal compound.

The "second polyfunctional monomer" is a compound that contains functional groups that can react with an aryl alkali metal compound. Polyfunctional means that it can react with at least two moles or equivalents of an aryl alkali metal compound, that is two aryl alkali metal groups (each containing 1 alkali metal atom) can react with the second monomer. This may be because there are two or more reactive groups on the second monomer that can each react with one mole or equivalent of aryl alkali metal compound or there may be one or more groups that can react with 2 or more moles or equivalents of the aryl alkali metal compound. Functional groups that can react with aryl alkali metal compounds include, but are not limited to, esters, acyl halides, alkyl carbonates, ketones, selected organic halides, epoxides, silicon, germanium, tin, boron and phosphorous halides, and alkoxysilanes. Preferred functional groups on the second monomer are esters, acyl halides, carbonates and silicon halides. Especially preferred second polyfunctional monomers are dialkyl carbonates, dialkyl terephthalates, terephthaloyl halides and silicon halides. Most preferred second polyfunctional monomers are dimethyl carbonate, dimethyl terephthalate, terephthaloyl chloride and silicon tetrachloride.

It is to be understood that the second polyfunctional monomer must be chosen so that the resin product does not contain more than 10 mole percent flexiblizing groups. That means that flexiblizing groups should not arise because they were originally present in the second polyfunctional monomer or are formed in the reaction of the second polyfunctional monomer with the polyfunctional aryl alkali metal compound. The products of the aryl alkali metal compounds with various functional groups are well known to those skilled in the art, so such selections will be readily made by such practitioners.

It will be understood by those skilled in the art that the term "polyfunctional" when applied to the aryl alkali metal compound or the second polyfunctional monomer is a nominal functionality. As the reaction proceeds a relatively rigid resin framework is (deliberately) built up. In such cases it is possible that groups that have not yet (completely) reacted may be unable to contact their complimentary reactive group because they are "frozen" in place. Thus a certain (usually unknown) percentage of functional group may go unreacted. The polyfunctionality referred to herein is the nominal functionality, as if all reactive groups have completely reacted. It is understood that at least 10 mole percent of the total amount of monomers in the polymerization must (nominally) have a functionality of 3 or more, preferably at least 25 mole percent of the monomers, and most preferably at least 45 mole percent of the monomers.

The process is preferably carried out in the presence of a solvent. Ethers are preferred solvents, and tetrahydrofuran is especially preferred. Solvents that contain groups that react readily with any of the reactants should of course be avoided. In particular solvents containing active hydrogen atoms should be avoided. Other solvents, as from the preparation of an alkali metal compound, may also be present (see Examples).

The process is carried out at a temperature of about −80° C. to about +70° C., preferably about −50° C. to about +35° C. It is preferred that the reaction mass be agitated.

Since aryl alkali metal compounds react with water, $CO_2$ and oxygen, these substances should be excluded (except if $CO_2$ is used as a second polyfunctional monomer). It is convenient to carry out the process under an atmosphere of inert gas, such as nitrogen or argon. Also, starting materials should be dry.

Product may be isolated by "quenching" any unreacted aryl alkali metal compound with a hydroxylic solvent such as methanol, separating the precipitated resin by filtration, washing to remove impurities and drying the resin. Unlike many high surface area resins and polymers which must be dried with care after they are first made, no special care need be taken in the drying of these resins to maintain their high surface area and porosity. It is believed this is at least partially due to the resin's highly crosslinked nature and the relatively rigid segments present in the resin.

In the following Examples, before measuring surface area and porosity by the BET method (supra), the samples were degassed at 80° C. for 14–16 hr. at $10^{-4}$ torr. The BET measurements were done with nitrogen.

EXAMPLE 1

A solution of 4,4'-dibromobiphenyl 9.369 g, (30 mmol) in anhydrous tetrahydrofuran (200 ml) in a flask equipped with a thermowell, mechanical stirrer and pressure equalized addition funnel was stirred and cooled to −60° C. using a dry-ice/acetone bath. The clear, colorless solution obtained was then treated with tert-butyllithium, 1.7M in pentane, 70.6 ml, 120 mmole) the addition rate of which was adjusted to maintain the reaction temperature below −60° C. This blue-green suspension was stirred at −60° C. for 1.5 hrs. Dimethyl carbonate 1.80 g was added dropwise. The resulting blue-gray suspension was then stirred at room temperature overnight (16 hrs.).

The reaction mixture was quenched with water (500 ml), and the solid product collected on a filter, repeatedly washed with water, until the filtrate was neutral to litmus paper, and was then dried under vacuum. Yield 5.74 g yellowish tan polymer.

Surface area: 644 $m_2$/g.
Monolayer of gas: 148 ml/g.
Pore Volume: 0.59 ml/g.
Avg. Pore Diameter: 33 Å.
C-13 CP-MAS: 81.4, 127.3, 139.5, 146.3 PPM.
IR: 3440 cm−1: (—OH); 3080: (═CH); 1610, 1495: (aromatic C═C), 815 cm−1 (p-disubstituted benzene).

Anal Calc. for $C_{19}H_{13}O$: C 88.7, H 5.1; Found: C 82.4, H 6.2, Br 1.8.

EXAMPLE 2

A solution of 4,4'-dibromobiphenyl (93.6 g, 300 mmol) in anhydrous tetrahydrofuran (2000 ml) in a flask equipped with a thermowell, mechanical stirrer and pressure equalized addition funnel was stirred and cooled to −74° C. using a dry-ice/acetone bath. The clear, colorless solution obtained was then treated with tert-butyl lithium, 1.7M in pentane, (910 ml, 1547 mmol) the addition rate of which was adjusted to maintain the reaction temperature below −68° C. This blue-green suspension was stirred at −74° C. for 2 hrs. then a solution of 4,4'-dibromobiphenyl (27.1 g, 86.8 mmol) in anhydrous tetrahydrofuran (300 ml) was added, the addition rate again adjusted to maintain reaction temperature below −68° C. Upon completion of the addition, the cooling bath was removed and the reaction mixture allowed to stir and warm to −20° C. The reaction mixture was maintained at a temperature of −20° C. by use of a wet-ice/methanol bath while a solution of dimethyl carbonate (23.23 g, 258 mmol) in anhydrous tetrahydrofuran (250 ml) was added dropwise. The resulting blue-gray suspension was then stirred to room temperature overnight (16 hrs.).

The reaction mixture was quenched with methanol (500 ml), acidified to pH~6 with hydrochloric acid (10N) and filtered. The filtercake was repeatedly washed with water, until the filtrate was neutral to litmus paper, then dried under vacuum. Yield 68.5 g (103%).

Surface area: 1167 $m_2$/g.
Monolayer of gas: 268 ml/g.
Pore Volume: 0.79 ml/g.
Avg. Pore Diameter: 28.2 Å.
C-13 CP-MAS: 80, 125.8, 138.8, 143.8 PPM
IR: 3570: (—OH); 3080 & 3030: (═CH); 1610, 1495: (aromatic C═C); 815 cm$^{-1}$: (p-disubstituted benzene).

About 3 g of "Sid Harvey's All Purpose Motor Oil" was floated on the surface of about 50 ml of water in a crystallizing dish. Then 0.75 g of the above resin was added. The mixture was gently agitated and the dish was tapped, after which all of the oil had been absorbed. Filtration yielded a resin which felt dry and powdery. Methylene chloride extraction of the resin resulted in reclamation of the oil. After the same resin was redried, it again absorbed oil in the same manner. This illustrates the use of the resin to absorb organic liquids (such as oil spills), and the ability to reuse the resin by extracting the absorbed matter.

A mixture of 1.56 g of benzene, 1.84 g of toluene, 2.16 g of benzyl alcohol (all 20 mmoles) and 300 ml of hexane was made up in an Erlenmeyer flask, and then 10 g of the above resin was added. The mixture was stirred 15 min and filtered. GC analysis before the resin was added and after it was filtered off indicate that the benzyl alcohol was almost completely removed by adsorption by the resin. The shows that besides being able to absorb organic compounds, such adsorption may be selective.

Equal volumes of methanol/water; tetrahydrofuran/water; tetrahydrofuran/hexane; methanol/hexane; and methanol/hexane/tetrahydrofuran were made up. To each was added 1/6 its weight of the above resin. The resulting mixture was filtered, and the filtrate was analyzed by GC. There was little or no preferential adsorption by the resin except for the last mixture in which there was a slight preference to absorb methanol.

EXAMPLE 3

A solution of 4,4'-dibromobiphenyl (9.36 g, 30 mmol) in anhydrous tetrahydrofuran (190 ml) in a flask equipped with a magnetic stirrer, thermowell and a stopcocked, septum-inlet adapter was cooled to $-73°$ C. by immersion in a dry-ice/acetone bath. The clear solution obtained was treated with n-butyllithium, 1.25M in hexanes, (48 ml, 60 mmol) with the addition rate adjusted to maintain the reaction temperature below $-65°$ C. The cooling bath was removed and the reaction mixture, a white suspension, was allowed to warm to 0° C., then recooled to $-73°$ C. in a dry-ice/acetone bath. A solution of dimethyl terephthalate (2.91 g, 15 mmol) in anhydrous tetrahydrofuran (75 ml) was added and the resulting greenish mixture allowed to stand and warm to room temperature overnight (16 hrs.).

The reaction mixture was quenched with methanol (200 ml), acidified to pH~5 with hydrochloric acid (10N) and filtered. The white, solid filtercake was washed with water, until the filtrate was neutral to litmus paper, rinsed with methanol and dried under vacuum. Yield 6.7 g (101%).

Surface area: 580 m$^2$/g.
Monolayer of gas: 133 ml/g.
Pore Volume: 0.42 ml/g.
Avg. Pore Diameter: 29.1 Å.
IR: 3570: (—OH); 3080: (=CH); 2950, 2920, 2860 & 2820: (sat'd —CH); 1720: (conj. C=O); 1610 & 1495: (aromatic C=C); 815 cm$^{-1}$: (p-disubstituted benzene).

EXAMPLE 4

A solution of tetra(p-bromophenyl)methane (9.54 g, 15 mmol) in anhydrous tetrahydrofuran (250 ml) in a flask equipped with a magnetic stirrer, thermowell and stopcocked, septum-inlet adapter was stirred and cooled to $-76°$ C. by immersion in a dry-ice/acetone bath. The clear yellow solution obtained was treated with tertbutyl lithium, 1.6M in pentane, (75 ml, 120 mmol) with the addition rate adjusted to maintain the reaction temperature below $-70°$ C. The resulting, deep-red, suspension was stirred at $-76°$ C. for 2 hrs., then a solution of dimethyl carbonate (0.90 g, 10 mmol) in anhydrous tetrahydrofuran (20 ml) was added dropwise. The cooling bath was removed and the reaction mixture, green suspension, was stirred to room temperature overnight (16 hrs.).

Methylchloroformate (10 ml) was added with stirring, to form carboxylic end groups, and the reaction mixture then quenched with methanol (50 ml). The reaction mixture was washed with water (3×500 ml) and the solids formed were collected by filtration, washed with water, then methanol and dried under vacuum. Yield 5.98 g (112%).

Surface area: 626.9 m$^2$/g.
Monolayer of gas: 144.09 ml/g.
Pore Volume: 0.52 ml/g.
Avg. Pore Diameter: 31.7 Å.
C-13 CP-MAS: 30, 50, 65, 80, 129 ppm, 146 ppm, 166 PPM.
IR: 3440: (—OH); 3080, 3060, & 3030: (=CH); 2950 cm$^{-1}$:sat'd CH; 1730 cm$^{-1}$:conj.ester C=O; 1605 & 1500: (aromatic C=C); 1280 cm$^{-1}$: (aromatic ester C—O—).

EXAMPLE 5

A solution of tris(p-bromophenyl)amine (4.82 g, 10 mmol) in anhydrous tetrahydrofuran (125 ml) in a flask equipped with a magnetic stirrer, thermowell and a stopcocked, septum-inlet adapter was cooled to $-75°$ C. by immersion in a dry-ice/acetone bath. The clear orange solution obtained was then treated with tert-butyl lithium, 1.48M in pentane, (40.5 ml, 60 mmol) with the addition rate adjusted to maintain reaction temperature below $-70°$ C. The cooling bath was removed and the yellowish reaction mixture allowed to warm to $-10°$ C., with stirring. The reaction mixture was recooled in an acetone bath by the addition of dry-ice, as necessary, to maintain a reaction temperature of $-30°$ C. while a solution of dimethyl carbonate (0.901 g, 10 mmol) in anhydrous tetrahydrofuran (20 ml) was added dropwise. The cooling bath was again removed and the greenish reaction mixture stirred to room temperature. The reaction mixture was stirred at room temperature for 3 hrs., quenched with methanol (100 ml) and the resulting orangeish mixture filtered. The filtercake was washed with methanol until the filtrate was neutral to litmus paper and dried under vacuum. Yield 2.93 g (103%).

Surface area: 549 m$^2$/g.
Monolayer of gas: 126 ml/g.
Pore Volume: 0.37 ml/g.
Avg. Pore Diameter: 25.8 Å.

EXAMPLE 6

A solution of 4-bromophenyl ether (12.30 g, 37.5 mmol) in anhydrous tetrahydrofuran (375 ml) in a flask equipped with a magnetic stirrer, thermowell and a stopcocked, septum-inlet adapter was stirred and cooled to $-75°$ C. by immersion in a dry-ice/acetone bath. The clear, colorless solution obtained was then treated with tert-butyl lithium, 1.7M in pentane, (88.2 ml, 150 mmol) with the addition rate adjusted to maintain the reaction temperature below $-70°$ C. The reaction mixture, a white suspension, was stirred at $-75°$ C. for 1 hr. after which a solution of dimethyl carbonate (2.25 g, 25 mmol) in anhydrous tetrahydrofuran (45 ml) was added dropwise and the resulting greenish tinted mixture stirred to room temperature overnight (16 hrs.).

The reaction mixture was quenched with methanol (100 ml), filtered and the filtercake repeatedly washed with methanol until the filtrate was neutral to litmus paper. The solid product obtained was dried under vacuum. Yield 6.86 g (93%).

Surface area: 384 m$^2$/g.
Monolayer of gas: 88 ml/g.
Pore Volume: 0.31 ml/g.
Avg. Pore Diameter: 27.8 Å.
IR: 3040: (=CH); 2940 & 2820: (sat'd—CH); 1595 & 1495: (aromatic C=C); 1235: (aryl C—O—); 830 cm$^{-1}$; (p-disubstituted benzene).

EXAMPLE 7

A solution of 4,4'-dibromobiphenyl (7.80 g, 25 mmol) in anhydrous tetrahydrofuran (156 ml) in a flask equipped with a magnetic stirrer, thermowell and a stopcocked, septum-inlet adapter was cooled to $-74°$ C. by immersion in a dry-ice/acetone bath. The clear solution obtained was treated with t-butyl lithium, 1.81M in methane, (55.2 ml, 100 mmol) with the addition rate adjusted to maintain the reaction temperature below $-65°$ C. The mixture was stirred 1 hr at $-74°$ C.

and 2.12 g (12.5 mmole) tetrachlorosilane was then added. After stirring 2 hr. at −74° C. the cooling bath was removed and the resulting greenish mixture was allowed to stand and warm to room temperature overnight (16 hrs.).

The reaction mixture was quenched with 600 ml MeOH/H$_2$O (1.1). The light yellow tan solid was collected on a filter, washed with more water, and was dried under vacuum. Yield 4.7 g.

Surface area: 1068 m$^2$/g.
Pore Volume: 0.66 ml/g.
Avg. pore Diameter: 24.7 Å.
13-C CP/MAS 141.5, 135.4, 126.7, ppm Si-29 MAS −14 ppm (Ar$_4$Si), −29 ppm (Ar$_3$SiO).
IR: 3600–3400 (OH), 3060, 3010 (=CH), 2960 (OH), 1590, 1520, 1480, (Ar, C=C) 1110, 700 (SiAr) 805 cm$^{-1}$ (p-Sub Ar).

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for the production of a resin comprising, reacting at least one polyfunctional aryl alkali metal compound with at least one second polyfunctional monomer, and isolating an insoluble resin with a surface area of at least 100 m$^2$/g and a porosity of at least 20%, and wherein said resin contains less than 10 mole percent, based on the total amount of monomer, of flexiblizing groups, provided that at least 10 mole percent of the total moles of said polyfunctional aryl alkyl metal compound and said second polyfunctional monomer has a functionality of 3 or more.

2. The process as recited in claim 1 wherein said polyfunctional aryl alkali metal compound is a lithium compound.

3. The process as recited in claim 1 wherein the temperature is about −80° C. to about +70° C.

4. The process as recited in claim 1 wherein said temperature is about −50° C. to about +35° C.

5. The process as recited in claim 2 wherein the temperature is about −50° C. to about +35° C.

6. The process as recited in claim 2 wherein said temperature is about −80° C. to about +70° C.

7. The process as recited in claim 1 wherein the process is carried out in a solvent.

8. The process as recited in claim 7 wherein said solvent is an ether.

9. The process as recited in claim 8 wherein said ether is tetrahydrofuran.

10. The process as recited in claim 2 wherein the process is carried out in a solvent.

11. The process as recited in claim 10 wherein said solvent is an ether.

12. The process as recited in claim 11 wherein said ether is tetrahydrofuran.

13. The process as recited in claim 7 wherein the temperature is about −50° C. to about +35° C.

14. The process as recited in claim 10 wherein the temperature is about −50° C. to about +35° C.

15. The process as recited in claim 1 wherein said polyfunctional aryl alkali metal compound has a carbon skeleton with one or more compounds selected from the group consisting of 1,4-phenylene, 4,4'-biphenylene, 4'',4-p-terphenylene, 9,10-anthracenylene, 2,6-anthracenylene, 1,4-naphthalenylene, 2,6-naphthalenylene, 3,3'-biphenylene, bis(4-phenylene)ether, tris(4-phenylene)amine, tetrakis(4-phenylene)methane, bis(4-phenylene)sulfide, 2,2-bis(4-phenylene)propane, tetrakis(4-phenylene)silane and bis(4-phenylene)dimethylsilane.

16. The process as recited in claim 2 wherein said polyfunctional aryl alkali metal compound has a carbon skeleton with one or more compounds selected from the group consisting of 1,4-phenylene, 4,4'-biphenylene, 4'',4-p-terphenylene, 9,10-anthracenylene, 2,6-anthracenylene, 1,4-naphthalenylene, 2,6-naphthalenylene, 3,3'-biphenylene, bis(4-phenylene)ether, tris(4-phenylene)amine, tetrakis(4-phenylene)methane, bis(4-phenylene)sulfide, 2,2-bis(4-phenylene)propane, tetrakis(4-phenylene)silane and bis(4-phenylene)dimethylsilane.

17. The process as recited in claim 15 wherein said carbon skeleton is selected from the group consisting of 1,4-phenylene, 4,4'-biphenylene and 4'',4-p-terphenylene.

18. The process as recited in claim 16 wherein said carbon skeleton is selected from the group consisting of 1,4-phenylene, 4,4'-biphenylene and 4'',4-p-terphenylene.

19. The process as recited in claim 17 wherein said carbon skeleton is 4,4'-biphenylene.

20. The process as recited in claim 18 wherein said carbon skeleton is 4,4'-biphenylene.

21. The process as recited in claim 14 wherein said polyfunctional aryl alkali metal compound has a carbon skeleton with one or more compounds selected from the group consisting of 1,4-phenylene, 4,4'-biphenylene, 4'',4-p-terphenylene, 9,10-anthracenylene, 2,6-anthracenylene, 1,4-naphthalenylene, 2,6-naphthalenylene, 3,3'-biphenylene, bis(4-phenylene)ether, tris(4-phenylene)amine, tetrakis(4-phenylene)methane, bis(4-phenylene)sulfide, 2,2-bis(4-phenylene)propane, tetrakis(4-phenylene)silane and bis(4-phenylene)dimethylsilane.

22. The process as recited in claim 21 wherein said carbon skeleton is selected from the group consisting of 1,4-phenylene, 4,4'-biphenylene and 4'',4-p-terphenylene.

23. The process as recited in claim 18 wherein said carbon skeleton is 4,4'-biphenylene.

24. The process as recited in claim 1 wherein said second polyfunctional monomer is selected from the group consisting of esters, acyl halides, alkyl carbonates and silicon halides.

25. The process as recited in claim 1 wherein said second polyfunctional monomer is selected from the group consisting of dialkyl carbonates, dialkyl terephthalate, terephthaloyl halides and silicon tetrachloride.

26. The process as recited in claim 1 wherein said second polyfunctional monomer is selected from the group consisting of dimethyl carbonate, dimethyl terephthalate, terephthaloyl chloride and silicon tetrachloride.

27. The process as recited in claim 2 wherein said second polyfunctional monomer is selected from the group consisting of esters, acyl halides, alkyl carbonates and silicon halides.

28. The process as recited in claim 2 wherein said second polyfunctional monomer is selected from the group consisting of dialkyl carbonates, dialkyl terephthalate, terephthaloyl halides and silicon tetrachloride.

29. The process as recited in claim 2 wherein said second polyfunctional monomer is selected from the group consisting of dimethyl carbonate, dimethyl terephthalate, terephthaloyl chloride and silicon tetrachloride.

30. The process as recited in claim 13 wherein said polyfunctional aryl alkali metal compound has a carbon skeleton with one or more compounds selected from the group consisting of 1,4-phenylene, 4,4'-biphenylene, 4",4-p-terphenylene, 9,10-anthracenylene, 2,6-anthracenylene, 1,4-naphthalenylene, 2,6-naphthalenylene, 3,3'-biphenylene, bis(4-phenylene)ether, tris(4-phenylene)amine, tetrakis(4-phenylene)methane, bis(4-phenylene)sulfide, 2,2-bis(4-phenylene)propane, tetrakis(4-phenylene)silane and bis(4-phenylene)dimethylsilane.

31. The process as recited in claim 29 wherein said second polyfunctional monomer is selected from the group consisting of esters, acyl halides, alkyl carbonates and silicon halides.

32. The process as recited in claim 21 wherein said second polyfunctional monomer is selected from the group consisting of esters, acyl halides, alkyl carbonates and silicon halides.

33. The process as recited in claim 1 wherein the bonds from the carbon atoms to the alkali metal atoms in said polyfunctional aryl alkali metal compound are linear or colinear with respect to one another.

34. The process as recited in claim 2 wherein the bonds from the carbon atoms to the alkali metal atoms in said polyfunctional aryl alkali metal compound are linear or colinear with respect to one another.

35. The process as recited in claim 13 wherein the bonds from the carbon atoms to the alkali metal atoms in said polyfunctional aryl alkali metal compund are linear or colinear with respect to one another.

36. The process as recited in claim 14 wherein the bonds from the carbon atoms to the alkali metal atoms in said polyfunctional aryl alkali metal compound are linear or colinear with respect to one another.

37. The process as recited in claim 1 wherein the reaction mass is agitated.

38. The process as recited in claim 2 wherein the reaction mass is agitated.

39. The process as recited in claim 1 wherein at least 25 mole percent of the total moles of said polyfunctional aryl alkali metal compound and said second polyfunctional monomer has a functionality of 3 or more.

40. The process as recited in claim 1 wherein at least 45 mole percent of the total moles of said polyfunctional aryl alkali metal compound and said second polyfunctional monomer has a functionality of 3 or more.

41. The process as recited in claim 5 wherein at least 25 mole percent of the total moles of said polyfunctional aryl alkali metal compound and said second polyfunctional monomer has a functionality of 3 or more.

42. The process as recited in claim 5 wherein at least 45 mole percent of the total moles of said polyfunctional aryl alkali metal compound and said second polyfunctional monomer has a functionality of 3 or more.

43. The process as recited in claim 6 wherein at least 25 mole percent of the total moles of said polyfunctional aryl alkali metal compound and said second polyfunctional monomer has a functionality of 3 or more.

44. The process as recited in claim 6 wherein at least 45 mole percent of the total moles of said polyfunctional aryl alkali metal compound and said second polyfunctional monomer has a functionality of 3 or more.

45. The process as recited in claim 13 wherein at least 25 mole percent of the total moles of said polyfunctional aryl alkali metal compound and said second polyfunctional monomer has a functionality of 3 or more.

46. The process as recited in claim 13 wherein at least 45 mole percent of the total moles of said polyfunctional aryl alkali metal compound and said second polyfunctional monomer has a functionality of 3 or more.

47. The process as recited in claim 14 wherein at least 25 mole percent of the total moles of said polyfunctional aryl alkali metal compound and said second polyfunctional monomer has a functionality of 3 or more.

48. The process as recited in claim 14 wherein at least 45 mole percent of the total moles of said polyfunctional aryl alkali metal compound and said second polyfunctional monomer has a functionality of 3 or more.

49. The process as recited in claim 21 wherein at least 25 mole percent of the total moles of said polyfunctional aryl alkali metal compound and said second polyfunctional monomer has a functionality of 3 or more.

50. The process as recited in claim 21 wherein at least 45 mole percent of the total moles of said polyfunctional aryl alkali metal compound and said second polyfunctional monomer has a functionality of 3 or more.

51. The process as recited in claim 27 wherein at least 25 mole percent of the total moles of said polyfunctional aryl alkali metal compound and said second polyfunctional monomer has a functionality of 3 or more.

52. The process as recited in claim 27 wherein at least 45 mole percent of the total moles of said polyfunctional aryl alkali metal compound and said second polyfunctional monomer has a functionality of 3 or more.

* * * * *